United States Patent
Baumler et al.

(10) Patent No.: US 8,979,459 B2
(45) Date of Patent: Mar. 17, 2015

(54) COMBINATION HANGER FASTENER

(71) Applicant: Infastech Intellectual Properties Pte., Ltd., Singapore (SG)

(72) Inventors: Duane C. Baumler, Decorah, IA (US); Mark A. Theismann, Decorah, IA (US)

(73) Assignee: Infastech Intellectual Properties Pte. Ltd., Singapore (SG)

(*) Notice: Subject to any disclaimer, the term of this patent is extended or adjusted under 35 U.S.C. 154(b) by 222 days.

(21) Appl. No.: 13/680,355

(22) Filed: Nov. 19, 2012

(65) Prior Publication Data

US 2014/0137392 A1    May 22, 2014

(51) Int. Cl.
| | |
|---|---|
| F16B 35/00 | (2006.01) |
| B23G 9/00 | (2006.01) |
| F16B 35/06 | (2006.01) |
| F16B 25/10 | (2006.01) |
| F16L 3/133 | (2006.01) |

(52) U.S. Cl.
CPC ............... B23G 9/001 (2013.01); F16B 35/06 (2013.01); *F16B 25/103* (2013.01); *F16B 25/106* (2013.01); *F16L 3/133* (2013.01)
USPC .......................................... 411/401; 411/389

(58) Field of Classification Search
CPC ................................ F16B 45/00; F16B 35/06
USPC .................... 411/400, 401, 427, 389, 485
See application file for complete search history.

(56) References Cited

U.S. PATENT DOCUMENTS

| | | | | |
|---|---|---|---|---|
| 633,909 | A | * | 9/1899 | Sanford ..................... 248/217.4 |
| 2,747,236 | A | * | 5/1956 | French ............................ 52/775 |
| 2,815,997 | A | * | 12/1957 | Korb ............................ 52/584.1 |
| 3,298,645 | A | * | 1/1967 | Morris ............................. 248/71 |
| 3,563,131 | A | * | 2/1971 | Ridley, Sr. ..................... 411/384 |
| 3,884,002 | A | * | 5/1975 | Logie ........................... 52/285.2 |
| 4,012,880 | A | * | 3/1977 | Logie ........................... 52/584.1 |
| 4,126,364 | A | * | 11/1978 | Reilly ............................ 312/140 |
| 4,636,125 | A | * | 1/1987 | Burgard ........................ 411/389 |
| 5,643,262 | A | | 7/1997 | Metz-Stavenhagen et al. |
| 5,746,556 | A | | 5/1998 | Sato |
| 5,755,542 | A | | 5/1998 | Janusz et al. |

(Continued)

FOREIGN PATENT DOCUMENTS

JP    2004340262    12/2004

OTHER PUBLICATIONS

Argco, Tech Sheet, Dec. 12, 2003, http://www.argco.com/pdf/techdata/elcohangermate.pdf.

*Primary Examiner* — Flemming Saether
(74) *Attorney, Agent, or Firm* — Hahn Loeser + Parks LLP; Arland T. Stein (57) ABSTRACT

Described in this application is a dual purpose hanger fastener for supporting a fixture, such as a pipe fixture, or the like to a building structure. The hanger fastener includes a threaded shank forming a first end portion and a head forming a second end portion where the head has both a cross-thread opening and an axial opening. The threaded shank is adapted to engage the structure and the head is adapted to receive a support member to support a pipe fixture or the like. For supporting the fixture, the head includes a cross-thread opening and an axial opening with the axial opening extending into the head to not less than one-thirty-second inch from the cross-thread opening. Both of the cross-thread and axial openings of the head of the hanger fastener are adapted to receive and engage the support member to support the pipe fixture or the like at the users option.

8 Claims, 7 Drawing Sheets

(56) References Cited

U.S. PATENT DOCUMENTS

| | | |
|---|---|---|
| 6,240,697 B1 | 6/2001 | Thompson et al. |
| 6,417,449 B1 * | 7/2002 | Perez-Bonifacini ............ 174/58 |
| 6,443,953 B1 | 9/2002 | Perra et al. |
| 6,811,365 B2 | 11/2004 | Monson |
| 7,082,664 B2 | 8/2006 | Powers et al. |
| 7,494,310 B1 | 2/2009 | Bodin et al. |
| 7,665,940 B2 | 2/2010 | Nilsen et al. |
| 7,780,134 B2 | 8/2010 | Panasik et al. |
| 8,201,381 B2 | 6/2012 | Heath |
| 8,211,155 B2 | 7/2012 | Winslow et al. |
| 8,817,178 B2 * | 8/2014 | Baker ............................ 348/375 |
| 2009/0116930 A1 | 5/2009 | Reimler |

* cited by examiner

COMBINATION HANGER FASTENER

BACKGROUND AND SUMMARY

Hanger fasteners are provide to mount pipe fixtures and the like to building structures, such as walls and ceilings. Hanger fasteners are known in the art. These fasteners include a threaded or screw shank and an integrally or separately formed head with a typically axial, threaded opening suitable to support suspending pipe fixtures from the building structure. The shank portion of the fastener is fastened to the building structure, and a threaded rod is inserted into the threaded opening in the head, and the pipe fixture is suspended from the threaded rod.

Described in this application is a dual purpose hanger fastener for supporting fixtures, such as pipe fixtures, to a building structure. The dual-purpose hanger fastener includes a shank portion forming a first end and an integral head portion forming a second end. The shank portion is adapted, typically by threads, to engage and fasten the hanger fastener to a building structure. The head portion of the hanger fastener includes a cross-thread opening and an axial thread opening extending into the head, each adapted to receive a support member such as a threaded rod. The axial opening extends to a depth not less than one-thirty-second inch from the cross-thread opening and may be to a depth between one-fourth and one-thirty-second of an inch from the cross-thread opening. The support member enables the hanger fastener to support a pipe fixture or the like either by the cross-thread opening or the axial opening of the fastener head within narrow space typically available for these purposes in a building structure.

In certain embodiments, the first shank portion of the hanger fastener may be threaded so the shank portion can engage the building structure by threading the shank into the structure. In an embodiment, a portion of the head includes a drive section to engage a tool to permit the shank portion of the hanger fastener to be driven into a building structure by the tool. This drive portion of the head may be, for example, a hexagon.

In the same or another embodiment, the shank portion of the hanger fastener may include a lead self-drilling portion to enable the hanger fastener to be driven into a building structure without first forming a pilot hole. In addition, the head portion of the fastener hanger adjacent the cross-thread opening may be counter-sunk to enable a support member to be more easily guided into the cross-thread opening. The axial and cross-thread openings of the head portion may be threaded to receive the support member, such as a threaded rod.

Also disclosed in this application is a method of making a dual purpose hanger fastener for supporting a fixture from a building structure. The method includes the steps of forming a threaded shank portion as a first end portion, forming a head portion as a second end portion with a cross-thread opening, and forming an axial opening in the head portion extending into the head portion to at least one-thirty-second of an inch from the cross-thread opening. The threaded shank portion is adapted to be threaded into a building structure and the cross-thread opening and axial opening adapted to receive a threaded rod.

In some embodiments of this method there may be an additional step of forming a counter sink portion in the head portion adjacent the cross-thread opening to guide a support member into the cross-thread opening. In this or another embodiments, a drive portion of the head may be formed with a hex profile and/or the threaded shank may include a self drilling lead to assist in driving the hanger fastener into a building structure. The axial and cross-thread openings e.g. three-eighth inch diameter, in the portion of the hanger fastener may be threaded to receive the threaded rod. The cross-thread opening may be substantially perpendicular to the axial opening of the head portion of the hanger fastener.

Also disclosed in this application is a method of assembling a pipe fixture or the like to a building structure with a hanger fastener. The method includes the steps of assembling a hanger fastener with a cross-thread opening and an axial opening extending into the head to a depth not less than one-thirty-second inch from the cross-thread opening, threading a threaded shank portion of the hanger fastener into a building structure, securing a support member to an axial opening or cross-thread opening of the head portion of the hanger fastener, and securing a fixture to the support member. The dual purpose hanger fastener may be assembled with a threaded shank adapted to be threaded into a building structure. The head includes a cross-thread opening and an axial opening, both adapted to receive a support member to support a pipe fixture or the like by the hanger fastener from a building structure.

In some embodiments of the method the first end portion is assembled with a self drilling lead portion on the shank portion. In this or other embodiment a portion of the head of the hanger fastener may be assembled with a drive portion adapted to receive a driving tool. The method may include the additional step of attaching a driving tool to this drive portion of the head portion of the hanger fastener to enable the shank portion of the hanger fastener to be driven into the building structure without a pilot hole. The dual purpose hanger fastener may include a counter-sink portion adjacent the cross-thread opening of the head portion to enable a support member to be guided into the cross-thread opening.

DETAILED DESCRIPTION

Figure 1:
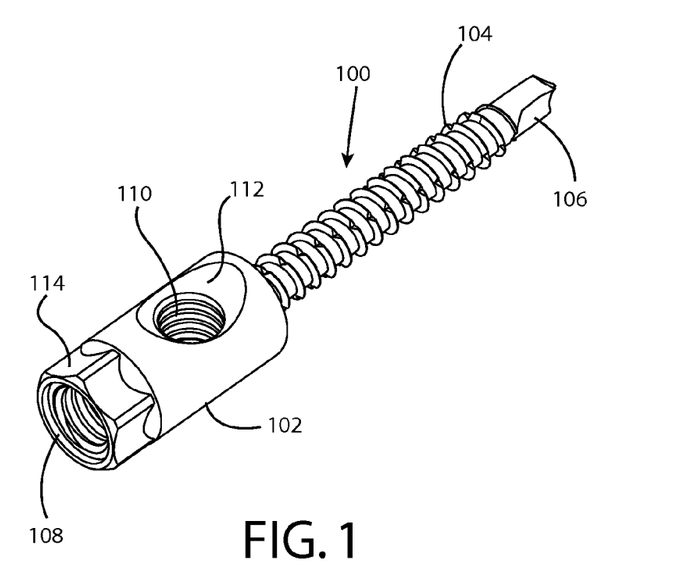
FIG. 1 is a perspective view of a hanger.

A dual purpose hanger fastener for use in attaching pipe fittings and the like in confined areas of a building structure is provided in FIG. 1. The hanger fastener 100 includes a head portion 102 and a threaded shank portion 104 integrally attached thereto and adapted to be threaded into a building structure. The threaded shank portion 104 includes an end 106 adapted to drive the hanger fastener 100 into a building structure. The head portion 102 includes an axial opening 108 extending into the head portion 102 and a cross-threaded opening 110 extending across the head portion 102. The cross-thread opening 110 may be provided with a countersink portion 112, counter-bore, or other recess to assist in guiding a threaded rod into engagement with the cross-thread opening 110. The head portion may also include at an end, opposite the threaded shank portion 104, a driving portion 114 adapted to receive a tool for driving the threaded shank portion 104 into a building structure. Building structure is used here in a broad sense to mean any structure of a commercial or residential building or construction site where hanger fasteners may be used to support pipe fixtures, cable and the like. A ceiling or wall assembly is available to enable plumbing, wiring and other support services to provided through the building.

The above-described dual purpose hanger fastener for use in attaching and running pipe, cable and the like through a building structure may be utilized as desired. According to the presently disclosed method, where FIGS. 2-6 are representative illustrations, the hanger fastener 100 may be attached to a building structure 116, such as a ceiling, wall or floor. The hanger fastener 100 may be attached to structural components—such as studs or joists—or other components—such as drywall or insulation—of the building structure. The hanger fastener 100 is attached by securing a tool to the driving portion 114 of the head 102 and rotating the hanger fastener 100 to drive the shank portion 104 into the building structure 116. The shank portion 104 may include a self-drilling lead at the end 106 to enable the threaded shank 104 to be driven into the building structure 116 and support the hanger fastener.

Once the hanger fastener 100 has been secured to the building structure 116 a support member (generally designated 118) may next be attached to the hanger fastener 100 to secure in place a pipe, cable, wiring, or other utility component 120. The support member 118 preferably includes a threaded rod that may be threaded into either or both of the axial opening 108 and the cross-thread opening 110. Attached to the support member 118 may be the utility component 120 or further structure, such as a strap 122, for supporting the utility component 120.

The head portion 102 of the hanger fastener 100 is provided of sufficient length to receive both the axial opening 108 and the cross-thread opening 110 and provide sufficient thread engagement in both of the openings to enable utility components 120 to be safely hung from the hanger fastener 100. Support hangers 118 may be provided with an axial 108 and cross-thread 110 openings of for example a ⅜" (9.5 mm) diameter. The head portion 102 may have a length dimension between 1.1 and 1.5" (28-38 mm) to accommodate the cross-thread opening 110 and allow the axial opening 108 to extend into the head 102 to a sufficient depth to enable sufficient thread engagement between the support hanger 118 and head portion 102 to support the utility component 120, and without the axial opening 108 intersecting of inhibiting to the cross-thread opening. The axial opening 108 preferably extends to not less than 1/32", e.g. 1/16" (1.6 mm); of the cross-thread opening 110.

Figure 2:
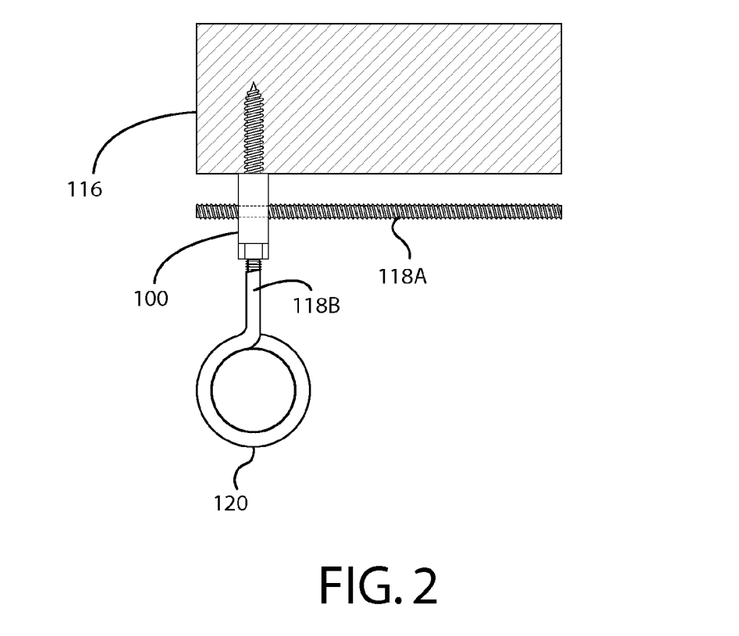
FIG. 2 is a side cutaway view of a hanger fastener shown in FIG. 1, mounting a pipe fixture to a building structure according to a first arrangement.

FIG. 2 illustrates one arrangement of support members 118 using the hanger fastener 100 of the present disclosure. In this arrangement, the hanger fastener 100 has been secured to a building structure 116, here a ceiling, by driving the threaded shank portion 104 into the ceiling 116 and rotating the hanger fastener 100 to thread the shank portion to a desired depth. A first support member 118A is threaded into or through the cross-thread opening 110 and may connect to another hanger fastener 100, support a utility component, allowing wires to be hung from the support member 118A, or provide additional structural support between hangers. A second support member 118B may be threaded into the axial opening 108 to support a utility component 120, wiring cables, or other utilities.

Figure 3:
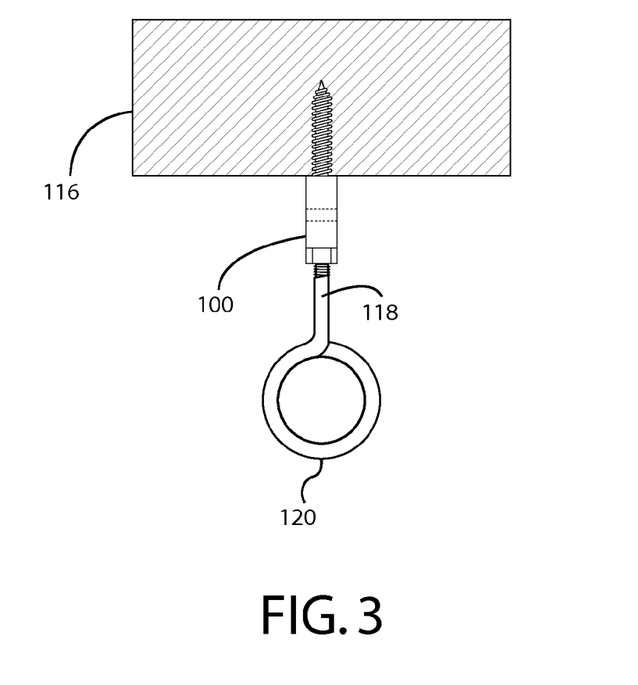
FIG. 3 is a side cutaway view of a hanger fastener shown in FIG. 1, mounting a pipe fixture to a building structure according to a second arrangement.
Figure 4:
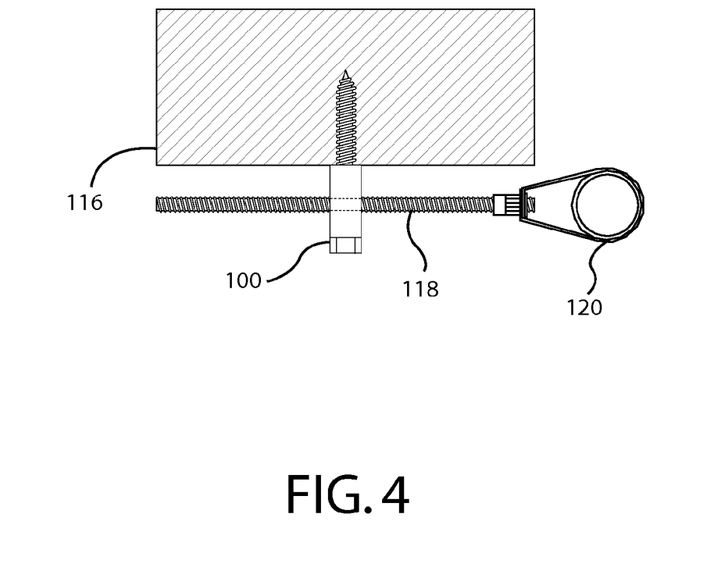
FIG. 4 is a side cutaway view of a hanger fastener shown in FIG. 1, mounting a pipe fixture to a building structure according to a third arrangement.

FIGS. 3-4 illustrate additional methods of using the dual-purpose hanger fastener 100. In these figures the hanger fastener 100 is attached to a ceiling building structure 116 and a support member 118 for supporting a utility component 120 is selectively attached either to the axial opening 108 as shown in FIG. 3 or to the cross-thread opening 110 as shown in FIG. 4, e.g. a tie-rod stabilizer. This improved hanger fastener allows a single size to be maintained in inventory and used for various different types of support members 118. In either of these arrangements the utility component 120 may be attached to the opposite end of the support member 118 and supported permanently in place by the hanger fastener.

Figure 5:
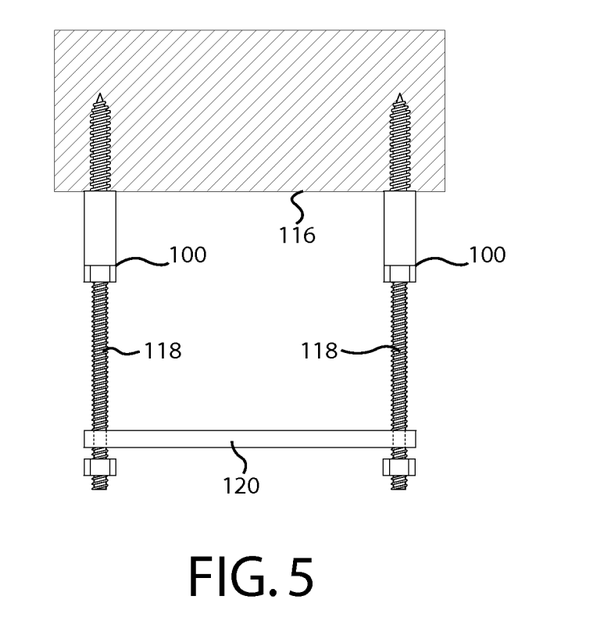
FIG. 5 is a side cutaway view of a hanger fastener shown in FIG. 1, mounting a pipe fixture to a building structure according to a fourth arrangement.

FIG. 5 illustrates another method of using the hanger fastener 100. In this arrangement, a plurality of hanger fasteners 100 may be provided and secured to a building structure 116 such as a ceiling. Support members 118, such as threaded rods, are then inserted into the axial openings 108 of the hanger fasteners 100 and extend downwards and away from the building structure 116. An utility component 120 or other structure may be supported between the support members 118. The utility component 120 may be secured to the support members 118 by known means such as nuts, threaded openings, hooks or other structure.

Figure 6:
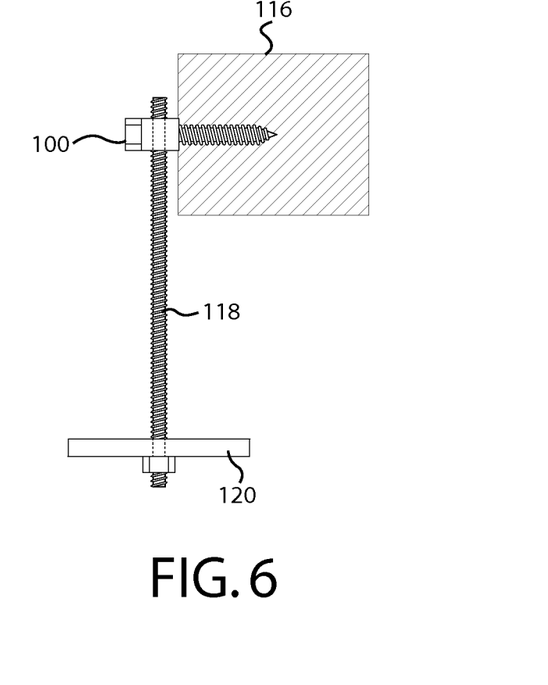
FIG. 6 is a side cutaway view of a hanger fastener shown in FIG. 1, mounting a pipe fixture to a building structure according to a fifth arrangement.

FIG. 6 illustrates another method of using the hanger fastener 100. In this arrangement, the hanger fastener 100 is secured to a building structure 116 such as a wall and a support member 118, such as a threaded rod, is inserted into the cross-thread opening 110. The support member 118 extends from to the building structure 116 and a utility component 120 such as a pipe fitting is attached by support member 118 to the hanger fastener 100. This arrangement allows utility components 120 such as pipe fittings and the like to be attached against a wall without securing the hanger fastener 100 to a ceiling.

Figure 7:
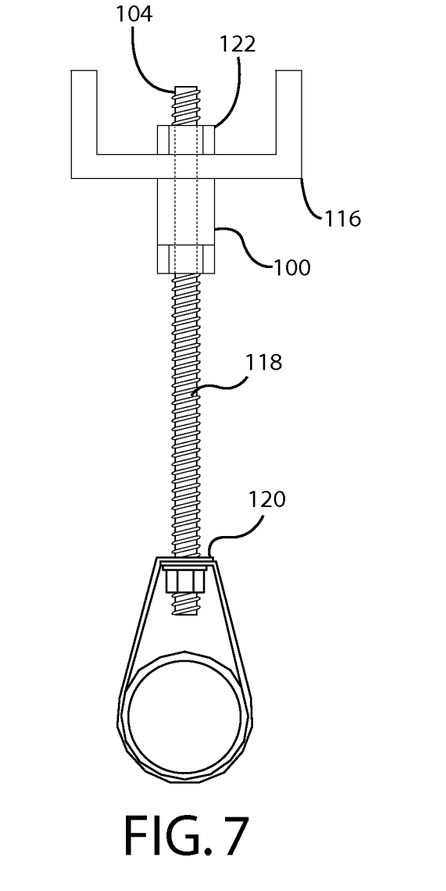
FIG. 7 is a side cutaway view of a hanger fastener shown in FIG. 1, mounting a pipe fixture to a building structure according to sixth arrangement.

An additional method of attaching the hanger fastener 100 to a building structure 116 is illustrated in FIG. 7. In this arrangement the building structure 116 comprises a beam or other similar structure that may be capable of supporting the hanger fastener 100 by thread engagement or the member may be unsuitable to self-threading. Rather than threading the shank portion 104 into the building structure 116, a pilot hole may be provided in the building structure 116. The shank portion 104 is then passed through the pilot hole and secured by means of a nut 122 or other hardware. The hanger fastener 100 is thereby supported to the structure 116 by the lock nut 122. Other means for anchoring the shank portion 104 are also contemplated, including wall anchors, tapped holes, or other structure for securing a support member 118 to a structure 116. This figure further illustrates one method of attaching a pipe or the like by the hanger fastener 100 to a building structure. In this embodiment, a support member 118 is secured to the axial opening 108 of the hanger fastener 100 and extends to a utility component 120 such as a strap 120. The strap 120 may be secured to the support member 118 by means of a nut which may be welded to the strap 120. A pipe may be supported by the strap 120 and thereby remain supported from the building structure 116 by hanger fastener 100.

Figure 8:
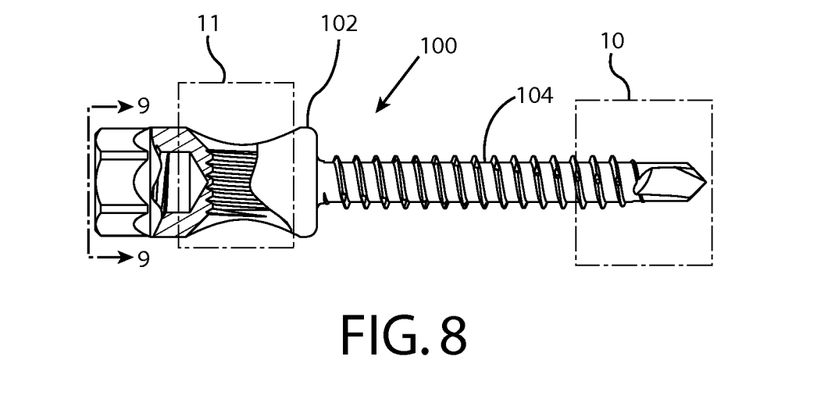
FIG. 8 is a side cutaway view of a hanger fastener according to one arrangement.

FIG. 8 is a side cutaway view of the dual hanger fastener 100 illustrated in FIG. 1. Various alternative arrangements of the dual hanger fastener 100 are shown in FIGS. 9-13. FIGS. 9A-D are end views of the head portion 102 taken along line 9-9 in FIG. 8 and illustrate various arrangements of the driving portion 114. FIGS. 10A-C are enlarged side views of the threaded shank portion 104 taken by section 10 in FIG. 8 and illustrating various arrangements of the end 106. FIGS. 11A-F are enlarged cutaway side views of the head portion 102 indicated by portion 11 in FIG. 8 and showing various alternative arrangements of the head portion 102 and cross-thread opening 110. FIG. 12 is an enlarged cutaway side views of the head portion 102 and threaded shank portion 104 in FIG. 8 and show various alternative arrangements of the intersection between the head portion 102 and threaded shank portion 104.

FIGS. 9A-D are end views of the hanger fastener 100 taken along line 9-9 in FIG. 8. These views illustrate various embodiments of the driving portion 114 of the hanger fastener 100 and are designed to correspond to a tool.

Figure 9A:
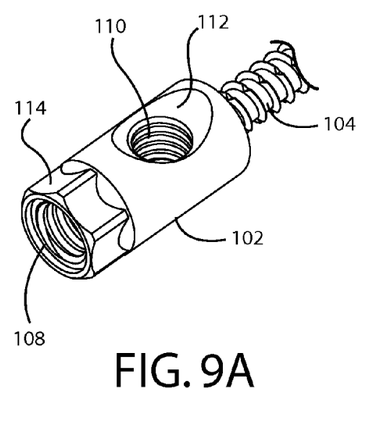
FIG. 9A is an end view of a hanger fastener according to a second arrangement.
Figure 10A:
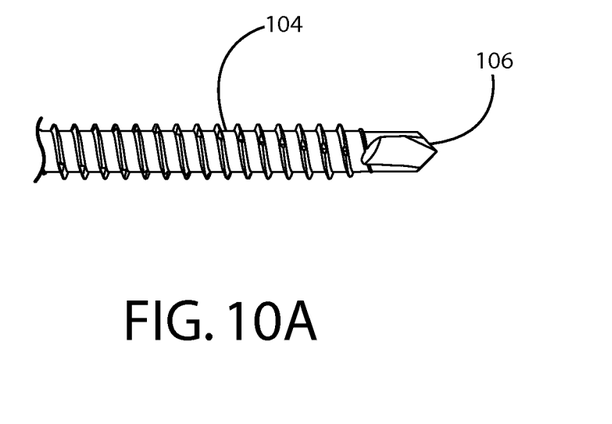
FIG. 10A is an enlarged view of the end of a hanger fastener according to a first arrangement.
Figure 10B:
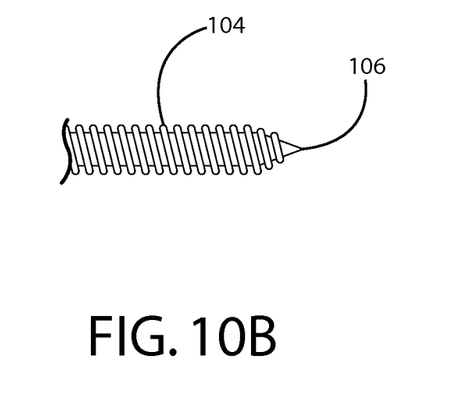
FIG. 10B is an enlarged view of the end of a hanger fastener according to a second arrangement.
Figure 10C:
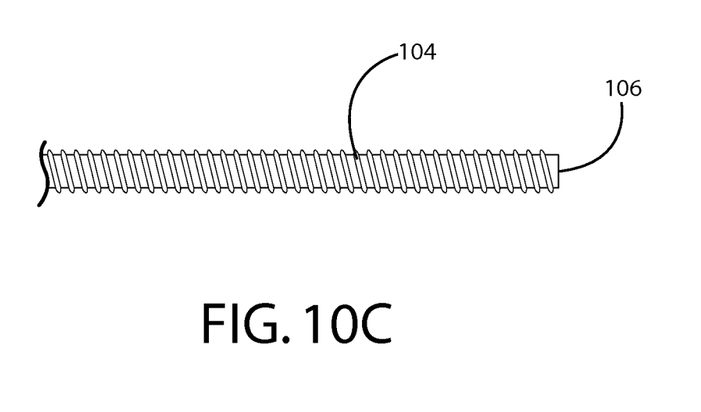
FIG. 10C is an enlarged view of the end of a hanger fastener according to a third arrangement.

FIG. 9A illustrates a first embodiment wherein the driving portion 114 comprises a hexagonal drive portion adapted to receive a wrench, or other type of external driver, including without limitation: high torque, multi-lobe, square, hexagonal, or other type of driver. The driving portion 114 may have a width of ½" (12.7 mm) for receiving a wrench or driver.

Figure 9B:
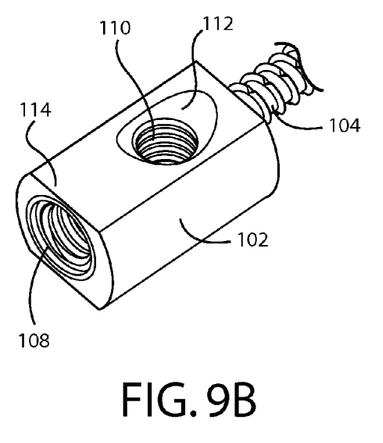
FIG. 9B is an end view of a hanger fastener according to a third arrangement.

FIG. 9B illustrates a second embodiment wherein the driving portion 114 is substantially cylindrical and includes opposite planar sides adapted to receive a wrench or the like. In this arrangement, the driving portion 114 may have a width along the head portion 102 sufficient to receive a wrench or other driver.

Figure 9C:
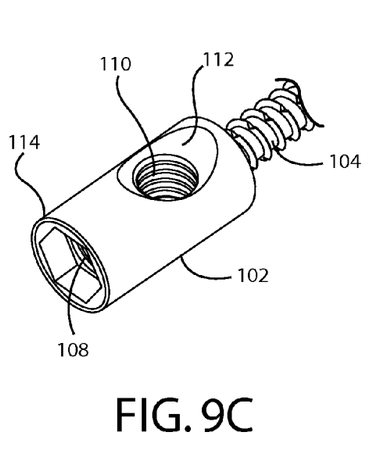
FIG. 9C is an end view of a hanger fastener according to a fourth arrangement.

FIG. 9C illustrates a third embodiment wherein the driving portion 114 comprises a recessed hexagonal drive portion adapted to receive a hexagonal driver, such as an Allen wrench. The recessed hexagonal portion is preferably centered on the axial opening 108 and extends to a depth of approximately ⅛" (3.2 mm) for receiving the wrench. Other arrangements of the driving portion 114 are contemplated for receiving various types of internal drives, including without limitation: multi-lobular drives, square drives, hexagonal drives, star drives, spline, or one-way drives.

Figure 9D:
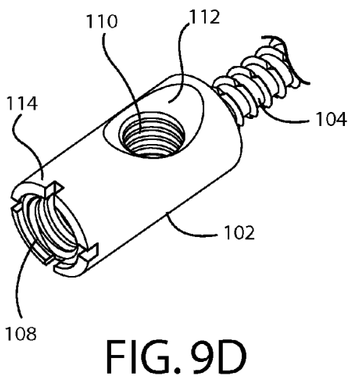
FIG. 9D is an end view of a hanger fastener according to a fifth arrangement.

FIG. 9D illustrates a fourth embodiment wherein the driving portion 114 comprises a recessed slot for receiving a screw driver, such as a flat or Phillips-type screw driver.

The embodiments illustrated in FIGS. 9A-D are intended to present various alternative examples. Various other arrangements for accommodating various drivers including square drives, multi-lobular drives, or other types of arrangements are also contemplated.

FIGS. 10A-C are side views of the threaded shank portion 104 of the hanger fastener 100 with particular emphasis on the end 106.

According to the embodiment illustrated in FIG. 10A the end 106 comprises a self-drilling lead tip. This self-drilling lead provides for driving the hanger fastener into a building structure without a preformed pilot hole to allow for efficient thread engagement of the threaded shank portion 104 with the building structure 116. A second embodiment is illustrated in FIG. 10B. According to this second embodiment, the threaded shank portion 104 is a tapered shank at the end 106 that is a self-threading lead suitable for attachment to wood. Illustrated in FIG. 10C is a third embodiment where the shank portion has an untapered shank and threads extending the length of the shank portion 104, commonly referred to as a machine screw thread. This type of shank portion involves a pilot hole and a nut or tapped hole to securely fasten the hanger fastener 100 therein. The embodiments illustrated in FIGS. 10A-C are intended to present various alternatives and are not intended to be limiting. Various other end 106 arrangements are also contemplated.

FIGS. 11A-F are cutaway views of the head portion 102 illustrating various embodiments of the cross-thread opening 110.

Figure 11A:
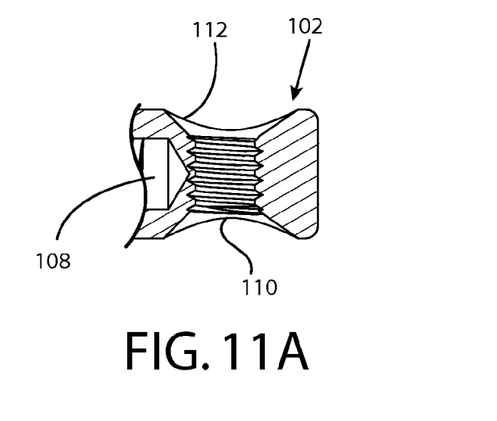
FIG. 11A is a cutaway view of the cross-thread opening of a hanger fastener according to a first arrangement.
Figure 12:
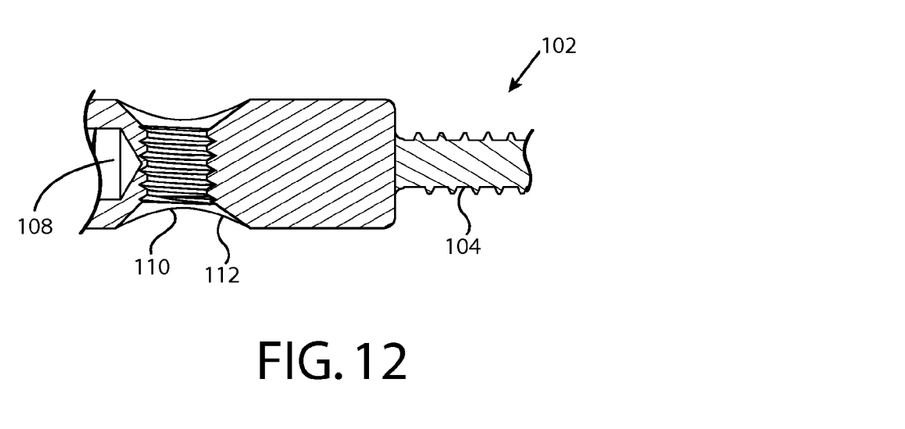
FIG. 12 is an enlarged view of the interface between the head portion and the shank portion of a hanger fastener according to a first arrangement.

According to the embodiment illustrated in FIG. 11A, the cross-threaded opening 110 extends through the width of the head portion 102. The axial opening 108 extends from an end of the head portion 102 towards the cross-thread opening 110 to not less than ¹⁄₃₂ of an inch and not intersect with the cross-thread opening 110. A concave counter-sink portion 112 is centered on the opening to the cross-thread opening 110 and provided to guide a threaded rod into the cross-thread opening 110. According to the illustrated embodiment, the cross-thread opening 110 and the axial opening 108 are threaded to receive a threaded rod or the like.

Figure 11B:
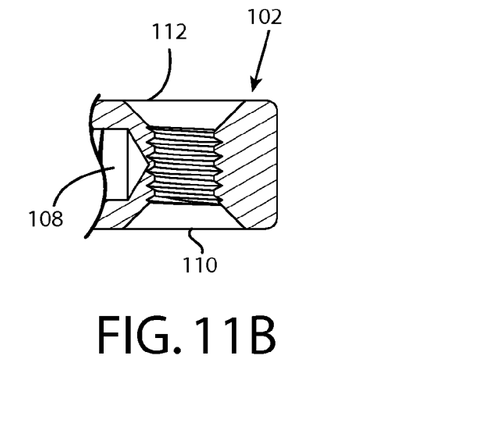
FIG. 11B is a cutaway view of the cross-thread opening of a hanger fastener according to a second arrangement.

An alternative embodiment is illustrated in FIG. 11B. According to this arrangement, the cross-thread opening 110 extends through the width of the head portion 102 and does not include a taper or counter-sink portion for directing a threaded rod into the cross-thread opening 110. As with the embodiment illustrated in FIG. 11A, the cross-thread opening 110 of this embodiment is threaded to receive a threaded rod or the like.

Figure 11C:
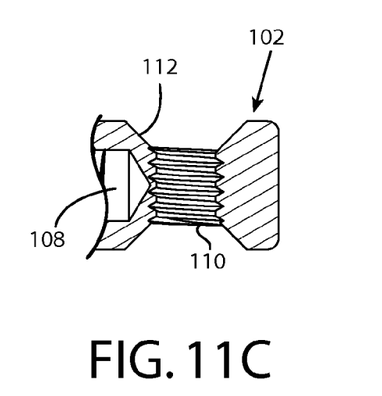
FIG. 11C is a cutaway view of the cross-thread opening of a hanger fastener according to a third arrangement.

Another alternative embodiment is illustrated in FIG. 11C. According to this arrangement a tapered counter-sink portion 112 is provided in lieu of the concave counter-sink portion 112 illustrated in FIG. 11A. The tapered counter-sink portion 112 similarly guides a threaded rod into the cross-thread opening 110. As with previous embodiments, the axial opening 108 is spaced from the cross-thread opening 110 by at least ¹⁄₃₂" (0.8 mm). The cross-thread opening 110 is threaded to receive a threaded rod or the like.

As described above, the hanger fastener 100 includes a head portion 102 and threaded shank 104. One method of attaching the threaded shank portion 104 to the head portion is provided in FIG. 12.

FIG. 12 illustrates an embodiment of the hanger fastener 100 where the threaded shank portion 104 is integrally formed with the head portion 102. According to this integral formation, the head portion 102 and threaded shank portion 104 are a single piece construction.

Also described in this application is a novel method for making a dual purpose hanger fastener for a fixture or the like. The novel method comprises a series of steps described as follows.

First, a shank portion is formed as a first end portion of a hanger fastener. The shank portion is adapted to engage a building structure as described above with reference to FIGS. 10A-C.

Second, a second portion of the hanger fastener is formed into a head portion. The head portion is formed with a cross-thread opening extending through the head portion and is adapted to receive a support member, such as a threaded rod.

Third, an axial opening is formed in the second end portion of the head portion. The axial opening extends into the head portion to not less than 1/32" (0.8 mm) from the cross-threaded opening. The axial opening is likewise adapted to receive a support member, such as a threaded rod. The gap between end axial opening in the head portion and the cross-thread opining is at least 1/32" (0.8 mm) and is generally between one-quarter inch and one-thirty-second inch to inhibit interference between the axial opening and the cross-thread opining yet provide a hanger fastener that can be useful in the limited space generally available for use in running utilities, wiring cable and the like in building structures.

The above described embodiments are intended to be exemplary embodiments of the claimed invention. These embodiments are not intended to be limiting as those having skill in the art will recognize that various other embodiments will be obvious from the foregoing. These alternatives are intended to be within the scope of the invention. Any limitations to the claimed invention will be in the claims as allowed.

What is claimed is:

1. A dual purpose hanger fastener for supporting a fixture to a building structure comprising:
   a. a fastener having a shank forming a first end portion and a head forming a second end portion;
   b. the shank adapted to engage a building structure;
   c. the head having a cross-thread opening adapted to receive a support member to provide a support for a fixture and an axial opening extending into the head to not less than one-thirty-second inch from the cross-threaded opening and adapted to receive a support member to provide a support for a fixture.

2. The dual purpose hanger fastener for supporting a fixture as claimed in claim 1 where the first shank portion is threaded and the shank engages the building structure by threading the shank into the structure.

3. The dual purpose hanger fastener for supporting a fixture as claimed in claim 1 wherein a portion of the head has a cross section adapted to engage a tool.

4. The dual purpose hanger fastener for supporting a fixture as claimed in claim 3 wherein the cross-section comprises a hexagon.

5. The dual purpose hanger fastener for supporting a fixture as claimed in claim 1 wherein the shank includes a self-drilling lead portion.

6. The dual purpose hanger fastener for supporting a fixture as claimed in claim 1. wherein the cross-thread opening includes a counter-sink for directing said support member into said cross-thread opening.

7. The dual purpose hanger fastener for supporting a fixture as claimed in claim 1 wherein the cross-thread opening is threaded to receive a threaded rod.

8. The dual purpose hanger fastener for supporting a fixture as claimed in claim 1 wherein the axial opening is threaded to receive a threaded rod.

* * * * *